Patented May 15, 1951

2,553,314

UNITED STATES PATENT OFFICE 2,553,314

METHOD OF RENDERING MATERIALS WATER REPELLENT

Charles P. Haber, Schenectady, N. Y., assignor to General Electric Company, a corporation of New York No Drawing. Application July 1, 1944, Serial No. 543,211

2 Claims. (Cl. 117—124)

The present invention relates to the treatment of materials to render them water-repellent. It is primarily concerned with the production of water-repellent materials by treating bodies with a composition comprising organo-silicon amines or mixtures of such organo-silicon-nitrogen compounds.

Patent 2,306,222 issued to Winton I. Patnode, describes and claims a process of rendering materials water-repellent which comprises treating the materials with vapors of an organo-silicon halide. As a hydrogen halide is a by-product of the treatment, the treated products are preferably brought into contact with an alkaline agent such as ammonia which neutralizes any acidity present as a result of the treatment.

The present invention is based on the discovery that water-repellent materials of the type described in the above mentioned Patnode patent can be obtained by contacting water-non-repellent materials with compositions comprising organo-silicon amines in vapor or liquid form. A major advantage of the present process is that no free hydrogen halide or other strong acid which may tend to weaken some materials is given off during the treatment.

The organo-silicon amines used in the practice of the present invention may be prepared, for example, by adding an organo-silicon halide or a mixture of organo-silicon halides to anhydrous ammonia. As starting materials I prefer to employ organo-silicon halides or mixtures of two or more organo-silicon halides having the average formula $R_nSiX_{4-n}$ where R represents a hydrocarbon radical, preferably a lower alkyl (methyl, ethyl, butyl, etc.), aryl (phenyl, etc.) alkaryl (tolyl, etc.) or aralkyl (phenylmethyl, etc.) radical, X represents a halogen atom, preferably a chlorine or bromine atom, and $n$ is a number equal to at least 0.5 and less than 3, and is preferably between about 0.7 and 2.8. Mixtures of two different organo-silicon halides, for example mixtures of a methyl silicon halide and a phenyl silicon halide, which mixture meets the above requirements, may also be used.

The organo-silicon amines formed by reacting the organo-silicon halides with ammonia under anhydrous or substantially anhydrous conditions are believed to comprise a complex mixture of silylamines, $R_nSi(NH_2)_{4-n}$ and straight chain and cyclic silazines containing Si—NH—Si linkages. The reactions leading to the formation of these products may be represented by the following equations covering possible reactions between a diorganodihalogenosilane (diorgano-silicon dihalide) and ammonia:

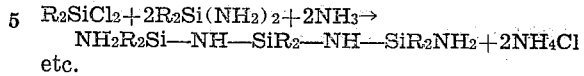

etc.

The term "organo-silicon amines" as used herein and in the appended claims therefore is intended to cover primary silicon amines such as the organo-silyl amines (organo-silicyl amines) $R_3SiNH_2$ and the related compounds, such as $R_2Si(NH_2)_2$, in which one or two R groups of the silyl amine are replaced by an amino group, as well as the straight chain and cyclic silazines (secondary amines) characterized by the presence of at least one and usually a plurality of

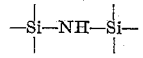

groups where at least one of the free silicon valences of each silicon is connected to a hydrocarbon radical and the remaining valences to nitrogen, or, in the case of a modification of the invention described more fully hereinafter, halogen atoms. In general, the major portion of the reaction products of ammonia and the organo-silicon halides will contain silazine groups. By fractional distillation, some of the individual components may be separated one from another. However, for the purposes of the present invention such separation is not necessary. In fact, I prefer to employ the mixed organo-silicon amines formed as a result of the ammonia reaction, without further treatment other than the separation of the ammonium halide formed during the reaction and, when desired, the dilution of the amines with suitable inert solvents such as benzene, toluene, ether, etc.

As is shown by the equations given hereinbefore, the reactions between the organo-silicon halide and ammonia are believed to comprise a stepwise conversion of the halide to a silylamine and the condensation of the silylamine to form linear or cyclic silazines. When sufficient ammonia is used to react with all the silicon halide the products will consist substantially of mixed organo-silicon amines. When lesser amounts of ammonia are used the products will include partially reacted organo-silicon halides containing both Si— halide and Si— amine linkages, i. e., compounds such as

where R and X have the meanings given hereinbefore. It is within the scope of the present invention to employ organo-silicon amines and organo-halogeno-silicon amines obtained by reacting organo-silicon halides with ammonia in amounts ranging from that sufficient to react with or replace at least half of the halogen atoms of the organo-silicon halide to that necessary to replace all of the halogen atoms. The products should have a nitrogen-to-halogen ratio of at least 1 and a neutral, or non-acid, action when employed for water-repellency applications. The by-products formed when water-non-repellent bodies are treated with these materials will consist primarily of ammonia or mixtures of ammonium halides and ammonia.

The following specific example is given to illustrate how the present invention may be carried into effect. *Example.*—Under substantially anhydrous conditions, 140 parts of a dimethyldichlorosilane containing a few per cent methyltrichlorosilane was slowly added to 500 parts by volume of liquid ammonia contained in a flask cooled by a dry ice-acetone mixture. After all the chlorosilanes had been added, the excess ammonia was allowed to evaporate and the reaction products principally comprising methylpolysilazines were extracted with benzene from the precipitated ammonium chloride. Water-non-repellent bodies treated with the resultant clear, water-white liquid mixture of methylsilicon amines were rendered water-repellent. A clean glass surface was coated with the mixed silicon amines by rubbing a small amount of the liquid mixture onto the surface and removing the excess with a clean cloth. An excellent water-repellent surface which resisted the action of acetone, alcohol, soap and water, etc. was obtained.

Various materials and surfaces such as paper, cotton cloth, wool, ceramic bodies, aluminum, and others specifically mentioned in the aforementioned Patnode patent can also be rendered water-repellent by contact with these partial or complete reaction products of an organo-silicon halide and ammonia, the results, in so far as the water-repellent characteristics of the treated products are concerned, being the same as those obtained by use of organo-silicon halides.

When the treating compositions comprise reaction products of organo-silicon halides with a quantity of ammonia insufficient to replace all of the halogen, any ammonium halide remaining on the treated cloth or other material can be removed by washing with water.

What I claim as new and desire to secure by Letters Patent of the United States is:

1. The process of treating a solid body to render it water-repellent which comprises treating the said body with a liquid composition comprising a complex mixture consisting essentially of cyclic and linear methyl polysilazines and obtained by effecting reaction between (a) a mixture of methyl chlorosilanes consisting essentially of dimethyldichlorosilane and methyltrichlorosilane wherein the methyltrichlorosilane is present to the extent of a few per cent and (b) liquid anhydrous ammonia which is present in an amount sufficient to give a methyl polysilazine substantially free of silicon-bonded chlorine.

2. The process of treating glass to make it non-wettable by water which comprises contacting the surface thereof with a liquid composition comprising a complex mixture consisting essentially of cyclic and linear methyl polysilazines and obtained by effecting reaction between (a) a mixture of methyl chlorosilanes consisting essentially of dimethyldichlorosilane and methyltrichlorosilane wherein the methyltrichlorosilane is present to the extent of a few per cent, and (b) liquid anhydrous ammonia which is present in an amount sufficient to give a methyl polysilazine substantially free of silicon-bonded chlorine.

CHARLES P. HABER.

REFERENCES CITED

The following references are of record in the file of this patent:

UNITED STATES PATENTS

| Number | Name | Date |
|---|---|---|
| 2,306,222 | Patnode | Dec. 22, 1942 |
| 2,389,805 | McGregor | Nov. 27, 1945 |
| 2,439,689 | Hyde | Apr. 13, 1948 |
| 2,462,635 | Haber | Feb. 22, 1949 |

FOREIGN PATENTS

| Number | Country | Date |
|---|---|---|
| 33,172 | Denmark | 1924 |
| 396,064 | Great Britain | July 17, 1933 |

OTHER REFERENCES

Kraus et al.—Journal Amer. Chem. Soc., vol. 56 (1934), pages 196, 197, 198, 199.